United States Patent [19]

Soga et al.

[11] 3,900,887

[45] Aug. 19, 1975

[54] METHOD OF SIMULTANEOUS MULTIPLEX RECORDING OF PICTURE AND DATA AND OF REGENERATING SUCH RECORD AND APPARATUS THEREFOR

[75] Inventors: Hiromu Soga; Katsuhiro Minamida, both of Tokyo; Kazuo Kurasawa; Masatake Ii, both of Hamamatsu, all of Japan

[73] Assignees: Nippon Steel Corporation, Tokyo; Hamamatsu TV Co., Ltd., Hamamatsu, both of Japan

[22] Filed: Jan. 18, 1973

[21] Appl. No.: 324,789

[52] U.S. Cl. ............ 360/18; 178/5.6; 178/DIG. 23; 360/19; 360/32; 360/33; 360/51

[51] Int. Cl. ............ H04n 5/78

[58] Field of Search ........... 178/6.6 A, DIG. 23, 5.6, 178/5.8 R; 179/2 TV; 340/174.1; 360/18, 19, 32, 33, 51

[56] References Cited

UNITED STATES PATENTS

| | | | |
|---|---|---|---|
| 3,446,914 | 5/1969 | Hodge | 178/6.6 A |
| 3,507,985 | 4/1970 | Breukink et al. | 178/5.6 |
| 3,723,637 | 3/1973 | Fujio et al | 178/DIG. 23 |
| 3,740,463 | 6/1973 | Youngstron et al. | 178/6.6 A |
| 3,743,767 | 7/1973 | Bitzer et al. | 178/DIG. 23 |
| 3,749,831 | 7/1973 | Simpkins | 178/DIG. 23 |

*Primary Examiner*—Raymond F. Cardillo, Jr.
*Attorney, Agent, or Firm*—Wenderoth, Lind & Ponack

[57] ABSTRACT

A method of simultaneous multiplex recording and regenerating of pictures and multichannel data, which comprises recording multichannel analog data or digital data, together with pictures on a video tape recorder by sequentially converting the data into digital signals by a multiplexer and an A/D converter and by placing said digital signals, in the form of pulses having a digital value of "0" or "1", combined with horizontal synchronizing signals of video signals issued from a television camera, into a slightly cleared space right after the horizontal synchronizing signals of the video signals; detecting said data pulses recorded right after the horizontal synchronizing signals from the video tape to regenerate said pulses into digital signals constituting the predetermined bit at the directive of a shift register operated by said horizontal synchronizing signals, and regenerating the data as analog or digital outputs from the digital signals. An apparatus therefor is disclosed.

10 Claims, 16 Drawing Figures

METHOD OF SIMULTANEOUS MULTIPLEX RECORDING OF PICTURE AND DATA AND OF REGENERATING SUCH RECORD AND APPARATUS THEREFOR

BACKGROUND OF THE INVENTION

The present invention relates to a method of simultaneous multiplex recording of pictures and data by inserting digital signals, into which multichannel data signals have been converted, into video signals for television by utilizing horizontal and vertical synchronizing signals, thereby forming a multiplex signal, and of regenerating the data analog or digital signals as data signals from the multiplex signals. An apparatus therefor is also disclosed.

Industrial television sets (hereinafter referred to as ITV) have long been used for monitoring. But the recently developed need to record a variety of related data simultaneously with patterns for measurement has gone unsatisfied. For instance, in the case of analysis or control of complicated processes, a wide variety of related data should be analyzed in relation to thermal or structural patterns for measurement. This includes, for example, information relating to the pressure and temperature inside a reactor, the input and output from a reactor and so forth. Moreover, particularly in medical studies or treatment, examination data relating to electrocardiograms, electromyograms and sphygmograms are better, in many cases, when recorded simultaneously with symptomatic patterns of patients.

In case such simultaneity is desired on ITV, it is so devised that figures, letters and the like are put on the corner of the video signal from the ITV or that pictures are taken by the ITV and data are recorded on another data recorder separately from the ITV but synchronized with it. However, it is not practical to convert the data into pictures at a low regeneration speed and with the low accuracy in reading by human eyes. If recorded separately, complete synchronization cannot be expected between patterns and related data, when a wide variety of data are recorded, even though synchronization may be possible, if the data variety is limited.

SUMMARY OF THE INVENTION

It is an object of the present invention to provide a method of treating pictures and multichannel data for simultaneous, multiplex recording and of recording such data on a video tape recorder (hereinafter referred to as VTR) as a digital pulse following horizontal synchronization signals of composite video signals; and of separately regenerating such signals recorded on a VTR as pictures and data for analysis.

Another object of the present invention is to provide a method of changing the data sampling rate according to the number of channels used in the abovementioned method, and particularly of raising the sampling rate in case the number of channels used is small.

A further object of the present invention is to provide a method of using two sets of apparatus, one for recording and the other for regeneration, thereby making it possible to simultaneously transmit data to remote places and record other data.

A futher object of the present invention is to provide a method of putting the abovementioned methods into practice in combination with computers and the like.

A further object of the present invention is to provide an apparatus for performing the abovementioned method.

The abovementioned and other objects of the present invention will be apparent from the following description of the preferred embodiment made in reference to the accompanying drawings.

DESCRIPTION OF THE PREFERRED EMBODIMENT

In the preferred embodiment, an ITV of the Japanese standard scanning system (horizontal scanning frequency: 15.75 KHz; vertical scanning frequency: 60 Hz) is used for the conversion of data from a maximum of 16 data channels into a digital signal, where one word consists of 12 bits and one set of data consists of 10 bits. Each word, then, consists of the 10 bits of data, a parity bit and a bit indicating a separation between data. This last bit is called a "word bit" and is put in the same position as for the data. A "group bit" is issued after all of the data has been sampled and recorded as video signals. A group bit is positioned after the horizontal synchronizing signal, delayed by a time $\Delta t_2$ in order to indicate that one cycle of data recording is completed.

The timing relations of this process are shown in FIG. 1*a* – 1*e*.

Figures 1A, 1B, 1C, 1D, 1E:
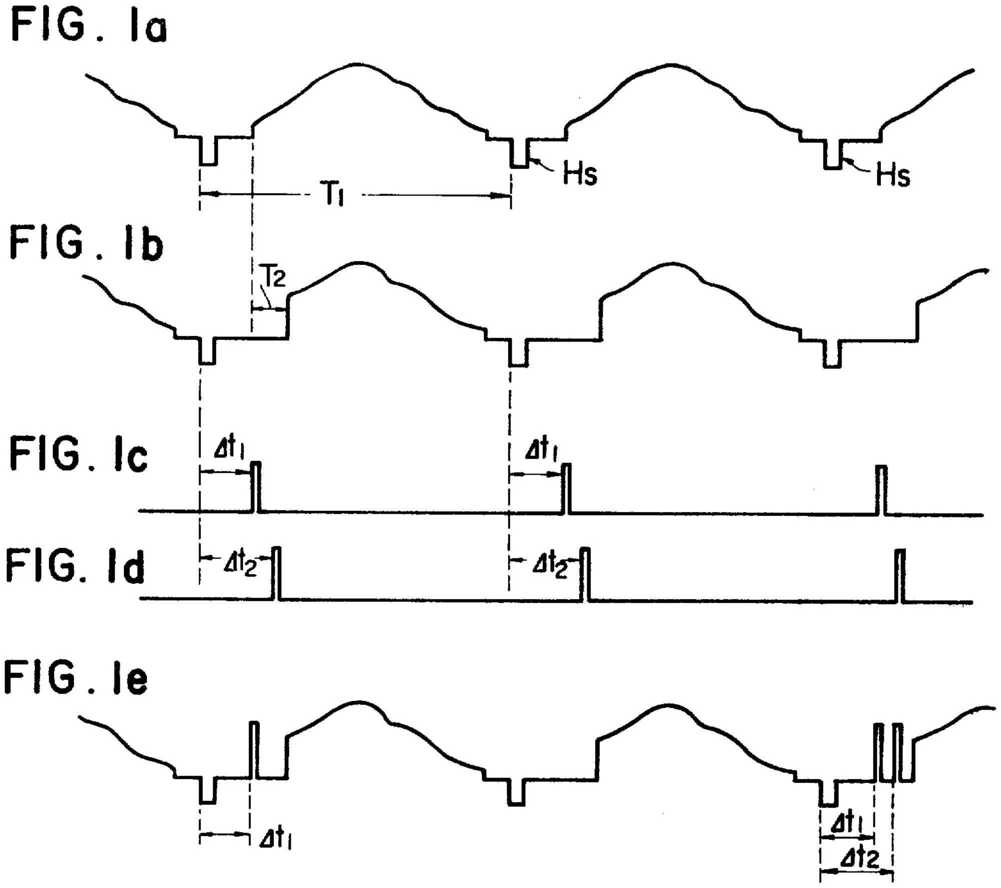
FIGS. 1*a* – 1*e* are explanatory views of the relationship of the video signals and the horizontal synchronizing signal used for the simultaneous, multiplex recording of pictures and multichannel data according to the invention.

FIG. 1*a* shows a series of horizontal scanning periods for picture signals, where Hs indicates a horizontal synchronizing signal. Each horizontal scanning period $T_1$ lasts about 63.5 $\mu$ sec. FIG. 1*b* shows a series of waves made by cancelling a portion of each of the video signals shown in FIG. 1*a* following the back porch of the video signal by an appropriate length of time $T_2$, in order to put digital data signals into the thus created spaces in the video signals, at a rate of one bit of data for one horizontal period of the video signal.

Figure 2:
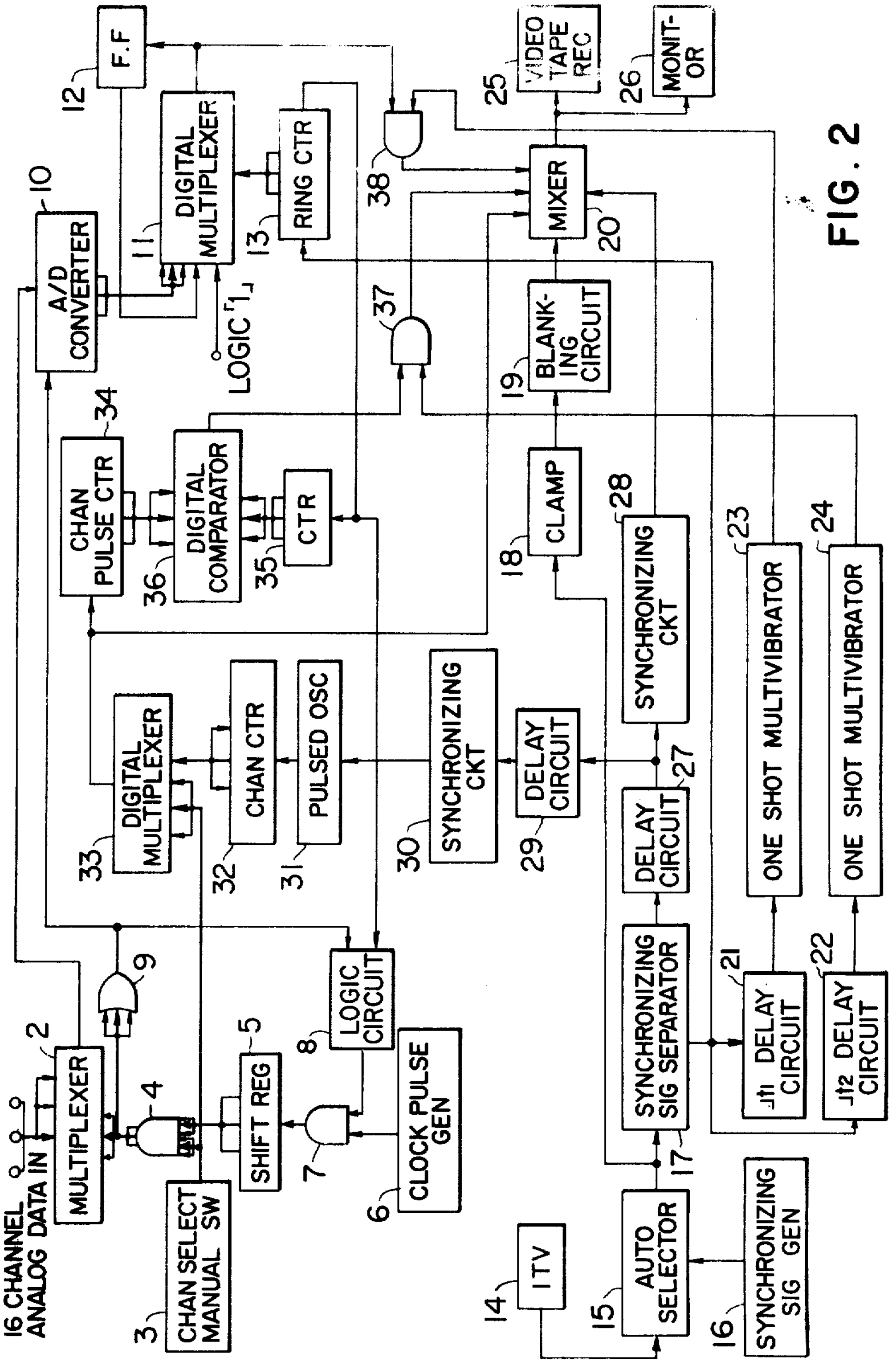
FIG. 2 is a block diagram of a system for the simultaneous, multiplex recording of pictures and multichannel data under the channel selection system according to the subject invention.

FIG. 2 is a schematic illustration of a recording system according to the subject invention. Explanation will be made with data of analog form. The 16-channels of analog data are connected with a multiplexer 2. The multiplexer 2 selects, in response to control signals described below, a specific signal from one of the input channels and transfers the signal to A/D converter 10. Numeral 3 indicates a group of manual switches; when turning on the switch for a desired channel, the switch is set to "1". Numeral 4 indicates a group of AND gates which are used for determining which of the 16 switches have been turned on. The manual switches 3 and a 16 bit shift register 5, operated by a clock pulse generator 6 having a frequency higher than that of horizontal synchronizing signal for television (for example 1 MHz), are connected to the group of AND gates 4. The switch for the channel in use has been set to "1", so that the group of AND gates 4 open only the appropriate gate of the multiplexer 2. The clock pulse which causes the shift register 5 to operate is controlled by AND gate 7 which will be further mentioned below.

The clock pulses, which are in effect controlled by a logic circuit 8, such as a flip-flop set by a word bit pulse positioned after the parity bit, are input to the shift register 5. More specifically, and as shown, logic circuit 8 is set by a word bit pulse generated by ring counter 13. As the ring counter is set, a clock pulse from generator 6 is input as a register clock pulse, and as the clock pulse is input, the register 5 is shifted from "1" to "16". When coincidence occurs between a channel switch and a channel of the shift register, the flip-flop is reset, halting the register at that channel. For instance, when the switch of channel 1 is set, coincidence with the first register takes place and the flip-flop is reset so as to stop the transfer of clock pulses to the register, thus halting the register at the first stop. When a next word bit pulse is received, the flip-flop is again set, so as to send a new clock pulse to the register.

If the channel 16 select switch is the next switch set to 1 at that time, the shift register 5 is shifted until coincidence with the register takes place and the flip-flop is reset with the 16th register set to 1, so as to stop the register clock, causing the register to remain at the 16th stop. This is the shifting from channel 1 to channel 16. Thus, the channels not in use are skipped over, and only the channels in use are selected. As the clock pulse frequency is about 1 $MH_z$, channel skipping can be done in one horizontal synchronizing period. (Reference FIG. 1.)

If, for example, channels 2, 5 and 7 are used for recording data, the switches of the group of manual switches 3 for channels 2, 5 and 7 are turned on (set to 1), thereby opening the corresponding gates of the group of AND gates 4 for recording data input to the multiplexer through channels 2, 5 and 7. That is, as data is input through channel 2, a series of 10 bit digital pulses are placed in the wave form in the region indicated by $T_2$, one bit for each of the horizontal synchronizing signals Hs. Then a parity bit pulse is inserted and then a word bit pulse is put in after the next horizontal synchronizing signal, thus completing one cycle. The logic circuit 8 is set by the word bit pulse. A clock pulse generated in the clock pulse generator 6 is applied through the gate 7 to the shift register 5 to drive it. When the signal for channel 5 of the shift register 5 coincides with the signal for channel 5 from the group of manual switches 3, an output from the multiplexer 2 is transferred from channel 2 to channel 5. At the same time, the logic circuit 8 is reset by an OR gate 9 connected to the group of AND gates 4, and the shift register 5 stops. In the same manner, 10 bit data pulses, a parity bit pulse and a word pulse are synchronized with 12 sets of horizontal synchronizing pulses Hs and put in $T_2$, the shift register 5 thereafter moving to channel 7 and stopping at that position.

Skipping over the unused channels, output from the multiplexer 2 is transferred from one channel to another toward the A/D converter 10 in every 12 sets of synchronizing signals.

The analog-to-digital converter 10 converts analog signals to a digital value of the required accuracy in preparation for processing of such analog signals. The converted digital value is output in the form of a parallel signal taking the "0", "1" pattern of the digital register attached to the A/D converter. As a start pulse of the A/D converter 10, an output from the OR gate 9 is used. Therefore, the conversion time of the A/D converter 10 may only last the duration of the time required for the shift register 5 to select channels from the length of one horizontal scanning period (63.5 $\mu$ sec.); if the frequency of the clock pulse generated in the clock pulse generator 6 is 1 MHz, the selection time lasts less than 16 $\mu$ sec., as the longest time is allocated for the selection of only one channel.

Therefore, and A/D converter with a conversion time of less than appropriately 40 $\mu$ sec. may be used. Again, a start pulse is applied from the OR gate 9 to the A/D converter 10, the A/D conversion of data of a channel finishes before the recording of data of the forerunning channel has been finished, a word bit pulse is generated and the next horizontal synchronizing signal appears. Each 10 bit output from the A/D converter 10 is respectively connected to input terminals of a digital multiplexer 11 numbered from 1 to 10.

The digital multiplexer 11 acts as a switching circuit for selecting bit by bit the abovementioned digital value developed at the output register of the A/D converter and sending this as a time series signal having states "0", "1" to the output side in correspondence in the "0", "1" pattern. The time for switching in this circuit is synchronized with the horizontal synchronizing pulse of the video signals. The eleventh input is connected to a parity flip flop 12. The twelfth input is connected to the level "1". The bit selection terminal of the digital multiplexer 11 is connected to a ring counter 13. This ring counter 13 counts the horizontal synchronizing signals and 10 data bits stored in the A/D converter 10 are sequentially transferred to the output of the multiplexer 11. When the eleventh horizontal synchronizing signal has been counted, the status of the flip flop 12, which is counting a copy of the 10 data bits, is recorded. A pulse may be applied to the flip flop 12 whether it is even or odd so long as the number of 10 bits data pulse parity becomes correspondingly even-numbered or odd-numbered. This process is useful for checking parity at the time of regeneration, as will be mentioned below in detail. After counting 12 pulses of the horizontal synchronizing signal, the ring counter 13 is reset and at the same time, one pulse is introduced to the output of the digital multiplexer 11. This pulse is the "word bit pulse" for one section of regeneration data and sets the logic circuit 8 for the selection of the successive channel. In this manner, data from the selected channel are turned into a digital signal and data bit pulses of 10 bits, a parity bit pulse of one bit and a word bit pulse of one bit are output from the digital multiplexer 11.

Data in digital form is mixed with the video signals by means of the following process and using the system detailed below. Numeral 14 indicates an Industrial Television (ITV) which is connected to an automatic selector switch 15. The automatic selector switch is so devised that when synchronizing signals stop being supplied from the industrial television camera, its synchronizing signal-issuing circuit automatically starts supply synchronizing signals. Number 16 indicates a synchronizing signal generator which issues a composite synchronizing signal consisting of a standard vertical synchronizing signal and a standard horizontal synchronizing signal. When a video signal is issued from the ITV, the automatic selector switch 15 transfers it to a synchronizing signal separator 17. When the video signal is interrupted, the automatic selector switch automatically changes the gate so as to apply a composite synchronizing signal (without a picture) issued by the synchronizing signal generator 16 to the synchronizing signal separator 17. The video signal supply may be interrupted when, for example, the industrial television camera malfunctions. The synchronizing signal separator 17 extracts from the composite video signal the horizontal synchronizing signal and the vertical synchronizing signal and outputs these signals. The so extracted horizontal synchronizing signal is delayed by $\Delta t_1$ in a delay circuit 21, and by $\Delta t_2$, in a delay circuit 22. Thereafter it is changed into narrow pulses of about 1 $\mu$ sec. in one-shot multivibrators 23 and 24. This process is shown in FIG. 1*c* and *d*. The time difference between $\Delta t_1$ and $\Delta t_2$ may be several $\mu$ sec. The circuit for putting pulses in the positions shown in FIG. 1*c*, by using the horizontal synchronizing pulse of video signals, is well known in the art.

The output from the automatic selector switch 15 is also connected to a clamper circuit 18 for direct-current regeneration of the video signal during the horizontal fly-back period, and such output is introduced into a blanking circuit 19. In the blanking circuit 19, the video signal is cut out during the $T_2$ period shown in FIG. 1*b*. The blanking pulse in this $T_2$ period is not shown, but it is formed at the delay circuit 21 and the one-shot multivibrator 23 by methods which are identical except for the difference in time constants. The output from the blanking circuit 19 is introduced into a mixer 20, along with a data pulse that will be detailed below. The output of the mixer 20 is in video form for recording on VTR 25, for monitoring by a monitor 26 or for transmission to remote places.

Data required by viewers in relation with pictures are sent to the multiplexer 2 as input in the form of, for example, an analog voltage. One of the signals is selected and sent to the A/D converter. This signal appears in the output register as a digital signal of 10 bits.

The ring counter 13 is constructed with a 12 bit shift register such that the output of the 12th stage is connected with the input of the first stage. This shift register is preset such that bit 1 takes the value "1", and bit 2 to bit 12 takes the value "0" and it is shifted by the horizontal synchronizing signals acting as a clock, separated from video signals to the right side. (See FIG. 2.)

Therefore, it is reset to the initial status automatically with the thirteenth clock pulse. Bit 1 to bit 10 are transferred to the "AND" circuit 38, together with output of bit 1 to bit 10 from the output register of the A/D converter.

As shown in FIG. 3, as "1" of the ring counter shifts from left to right, output bits from the A/D converter are sequentially transferred through the "OR" circuit to the space after the horizontal synchronizing pulse of the video signals, but delayed by $\Delta t_1$. After the recording of the last data, the parity bit is recorded. If the parity bit is so arranged that output from 11, input to the flip-flop 12, has the initial value "0", flip-flop 12 is reversed whenever the output is "1" and the status of flip-flop 12, when the final data bit is recorded, shows a bit of even parity. Therefore, the above-shown wire connection will cause a parity bit automatically at the 11th gate of the ring counter. The word bit, which indicates the completion of recording the data at the 12th stage of the ring counter, is always recorded as a "1".

As mentioned above, the data bit pulses, the parity bit pulse and the word bit pulse are applied to the digital multiplexer 11 in this order and synchronized with the horizontal synchronizing signal. The output of the digital multiplexer 11 and the output of the one shot multivibration 23 are both connected to AND gate 38 and the output of the AND gate 38 and the signals from the other circuit are mixed in the mixer 20. Thus the pulse turned into code is inserted into position, delayed by $\Delta t_1$ as shown in FIG. 1*e*.

One section of data is recorded per 12 video signals by codifying data from used channels and by inserting the pulses one by one into position, each delayed by $\Delta t_1$ from the horizontal synchronizing signal of the video signal. In the embodiment of the present invention, after recording data of 16 channels maximum, recording is restarted with the first channel. A pulse is required to show that all of the channels have been used once. As described in detail later on, this pulse is applied to an AND gate 37 and is called a "group bit" pulse. A pulse to indicate which of the channels 1 to 16 is being used is also required.

Figure 4:
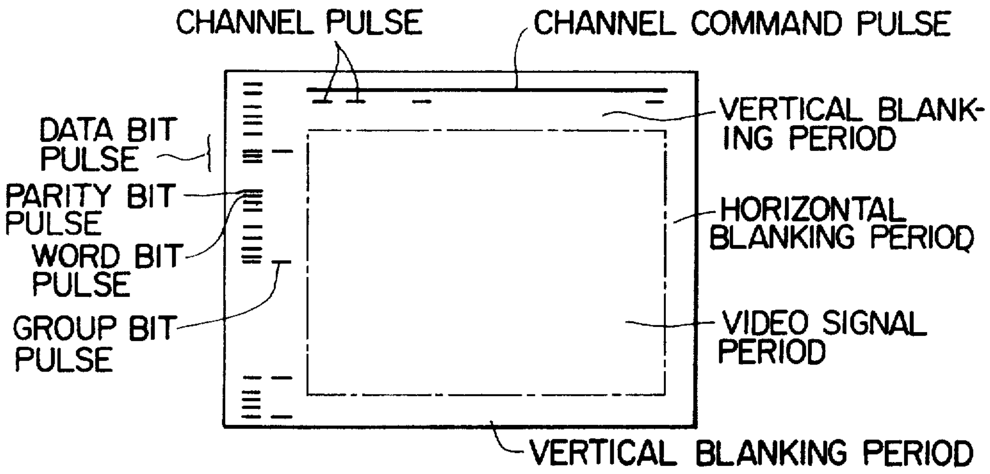
FIG. 4 is a scheme indicating the video signal represented by a monitor according to the invention.
Figures 3A, 3B, 3C, 3D, 3E, 3F, 3G, 3H:
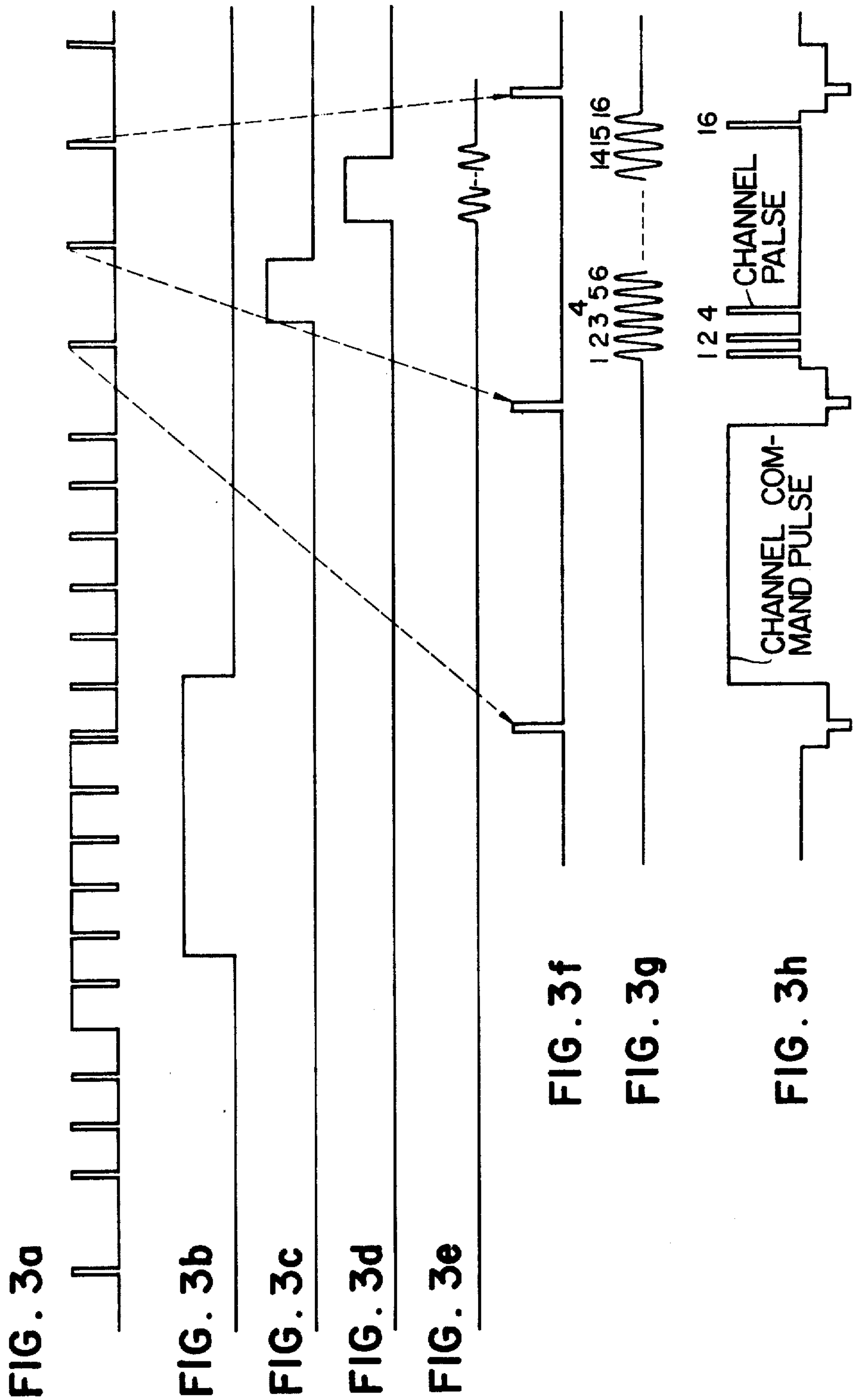
FIG. 3*a* shows synchronizing signals of the vertical fly-back period as magnified.
FIG. 3*b* shows vertical synchronizing signals extracted from the synchronizing signals and delayed.
FIG. 3*c* shows signals extracted from the signals shown in FIG. 3*b*, delayed and synchronized with the horizontal scanning signals.
FIG. 3*d* shows signals extracted from the signals shown in FIG. 3*b*, delayed and synchronized with horizontal scanning signals; that is, signals delayed by one horizontal period from the signals shown in FIG. 3*c*.
FIG. 3*e* shows an output waveform which occurs only when the digital waveform of FIG. 3*d* assumes the value "1".
FIG. 3*f* shows the synchronizing signals shown in FIG. 3*c* and FIG. 3*f* as magnified only for the period when the value "1" is attained.
FIG. 3*g* is a magnified view of the signals shown in FIG. 3*e*.
FIG. 3*h* shows picture signals taken out as output from mixer 20, when the signals shown in FIG. 3*c* and the signals produced in digital multiplexer 33 for indicating the channels in use, are mixed so as to form pictures.

FIGS. 3*a* – 3*h* broadly disclose synchronizing signals and picture signals in the vicinity of the vertical fly-back period, for selecting channels and indicating the channels in use, which also explains the channel command pulse and channel pulse of the vertical blanking period shown in FIG. 4. A synchronizing signal, shown in FIG. 3*a*, is removed from the video signal issued from the ITV 14 in the vicinity of the vertical fly-back period by the synchronizing signal separator 17. A vertical synchronizing signal shown in FIG. 3*b* is extracted from the synchonizing signal, such vertical synchronizing signal being delayed by an appropriate time (about 6 or 7 horizontal scanning periods) by the delay circuit 27, and a pulse lasting for only one effective period of the horizontal video signal is extracted from the output of the synchronizing circuit 28 and mixed on a white level of the mixer 20, as shown in FIG. 3*c*. This synchronizing circuit 28 consists of JK flip-flops. A pulse for one effective scanning period which has been delayed by one horizontal scanning period in a delay circuit 29, as shown in FIG. 3*d*, is formed in a synchronizing circuit 30, and then initiates operation of a pulsed oscillator 31, forming waves shown in FIG. 3*e*. As the waves near the pulse are enlarged, the horizontal synchronizing signal is illustrated as shown in FIG. 3*f*; and the output from the pulsed oscillator 31 consists of 16 pulses during each scanning period as shown in FIG. 3*g*.

Each pulse is shaped and output as a channel selection pulse by the pulsed oscillator 31, and a channel select counter 32 is thereby activated. The output from the channel select counter 32 corresponds to a group of 16 switches of the channel select manual switches 3, which activate digital multiplexer 33 for channel selection. The pulse output from the digital multiplexer 33 is a channel pulse which indicates the used channel, and is applied to the mixer 20 together with the pulse from the synchronizing circuit 28, to be mixed with the video signal. For instance, if switches for channels 1, 2, 4 and 16 are closed, they are mixed with the video signal, as shown in FIG. 3*h*. Elements 30, 31 and 32 constitute a channel pulse indicating circuit to achieve the results shown in FIG. 3*h*.

In circuit 29, signals which are delayed by a certain time from vertical synchronizing signals, are extracted and in circuit 30, one horizontal period later, the delayed signals are input to the pulse oscillator 31.

This is necessary to put the pulses for indicating which of channels 1 to 16 are in use into the picture. Each pulse is made by elements 29, 30, 31, 32 and 33. Vertical synchronizing signals, shown in FIG. 3*b*, are extracted from the synchronizing separating circuit 17 near the vertical fly-back period. After an appropriate delay, signals of one horizontal period shown in FIG. 3*d* are taken out from synchronizing circuit 10 and only for said period, the pulsed oscillator 31 is initiated, so that a waveform such as shown in FIG. 3*e* is obtained. This is shown in FIG. 3*g* in enlarged form. Such signals are shaped and output as channel selection pulses which operate channel counter 32. The channel counter operates on the 16 system, and output therefrom is sent to digital multiplexer 33 for selecting channels in use. In coincidence with the channels in use on the channel select switch, output from the channel counter 32 is superimposed on the pictures as the signal of the channels in use. For instance, if switches of channels 1, 2, 4 and 16 of the manual switch group 3 are turned on, the 1st, 2nd, 4th and 16th outputs of the counter coincide with the output from said switches, so that the channels synchronized with the countering time are selected to be mixed with pictures as shown in FIG. 3*h*.

A pulse from the synchronizing circuit 28 is called a "channel command" pulse. During regeneration this channel command pulse is used as a clue in the search for the position at which a channel pulse is input.

A group bit pulse which shows that all the channels have been once used is generated in the following manner. The channel pulse output from the digital multiplexer 33 is counted in a 4 bit channel pulse counter 34. The channel pulse counter 34 memorizes which channels are used during one horizontal scanning period. Numeral 35 indicates a 4 bit counter which counts in response to a 1/12 count pulse; specifically, a word bit pulse of the ring counter 13. The 4 bit channel pulse counter 34 and the 4 bit counter 35 are both connected to a digital comparator 36; and when all the data for the used channels have been recorded, the digital comparator 36 is activated. The output pulse from an AND gate 37, to which the digital comparator 36 and the one-shot multivibrator 24 are connected, is a "group bit" pulse and is generated only when all of the channels have been used once and is mixed with the video signal in the mixer 20 but delayed relative to the horizontal synchronizing signal by $\Delta t_2$.

Though not shown in the drawings, the 4 bit channel pulse counter 34 is reset by a channel command pulse, and the bit counter 35 is reset by a group bit pulse which is an output of the AND gate 37. The group bit pulse is a pulse delayed by $\Delta t_2$ from the horizontal synchronizing pulse, and is mixed with the video signals in the mixer 20, as shown in FIG. 1*e*. Thus data in digital signal format are recorded together with the video signal into the place at the left end of the video signal, after it has been cleared for receiving such data, and when recording has been finished on all channels (skipping over the channel not used for recording data) a group bit pulse is inserted into the cleared place from the position of the data bit pulses. For this puspose, data recording is made even in the vertical fly-back period which is not used as a normal video signal. And 1 to 16 channel pulses are set in the effective video scanning period in which the channel pulse, which normally indicates which channels are used, is not used as the normal video signal of the vertical fly-back period.

Such treatment makes it possible to put in a video signal, a digital signal of various data as well as pictures, merely by clearing a space of several % at the left end of the picture, while the 10 bit data format allows an accuracy of 1/1024. This system of recording picture signal can be applied to a VTR of normal type without any remodelling. It also makes it possible to transmit pictures and miltichannel data to remote places by using one coaxial cable for video signs. In FIG. 4 a monitoring picture is shown which is produced by putting into the monitor 26 a composite signal with multichannel data which is an output from the mixer 20 shown in FIG. 2. Thus, data of the unused channels are not recorded, such channels being skipped over, resulting in the difference in the speed of recording data, that is, sampling rate, according to the number of the used channels.

FIG. 4 shows that if a part of picture is blanked so that data are put in, the monitor indicates this.

The sampling rate is calculated as follows:

$$\frac{f_H}{12N} \text{(Hz)}$$

where:

$f_H$ = scanning frequency of the ITV $N$ = number of the used channels

In the embodiment of the present invention, $f_H$ for the Japanese standard system is 15.75 KHz, making 1312.5/N(Hz), which makes it possible to recored phenomena of several hundred Hz when only one channel used, and allows a sampling rate of about 82 Hz when all channels are used, for a wide coverage of phenomena.

As shown in FIG. 4, elements 34, 35 and 36 constitute a circuit for generating group bit pulses which indicate the completion of one operation of scanning the channels.

The channel pulse counter 34, which is a 16 system ripple counter, counts channel pulses comprising 4 bit binary code from the digital multiplexer 33 and memorizes the channels in use.

Bit counter 35 is a 16 system ripple counter which counts word bit pulses comprising 4 bit binary code as block input.

When the output from the channel pulse counter 34 coincides with the output from the counter 35 at the digital comparator 36, a group bit pulse is generated and video signals are fed to the mixer 20 synchronized with the period $\Delta t_2$. Assuming that the 1st, 2nd, 4th and 16th channels are in use, the channel pulse counter 34 stops after it has been advanced by four channel pulses. A word bit pulse is generated for each channel being used, so four word bit pulses, for the 1st, 2nd, 4th and 16th channels, are developed and are fed to the counter 35 as clock pulses. Therefore, the counter 35 stops after it has been advanced by four pulses and a group bit pulse is generated on coincidence of the outputs from channel pulse counter 34 and counter 35. One scanning cycle of the series of channels is completed by scanning only the 1st, 2nd, 4th and 16th channels and pictures and data are recorded in order of four channels.

An explanation of the method of simultaneous regeneration of picture and data by means of the so recorded composite video signal with multichannel data is presented below, in conjunction with FIG. 5.

In practice, many circuits are used in common for recording and regeneration but for the convenience of explanation, the two systems are shown separately.

The video signal which was recorded as mentioned above, is regenerated and output from a VTR 51, or a horizontal synchronizing signal and a vertical synchronizing signal are extracted from the composite video signal. The video signal is applied through a DC restorer 53 to an outside monitor 54. At the same time, the video signal is shaped into pulses having valves of "1" and "0" by a slicer 55 having an appropriate slicing level, so that the digital data bit pulses, etc. can be separated into the white and black levels.

The horizontal synchronizing signal which has been separated by a synchronizing signal separator 52 forms a pulse delayed by $\Delta t_1$ and $\Delta t_2$ in the circuits 56, 57, 58 and 59 which respectively correspond to the circuits 21, 22, 23 and 24 shown in FIG. 2. From an AND gate 60, into which an output signal from the slicer 55 and a one-shot multivibrator 58 are input, only a data bit pulse, a parity bit pulse and a word bit pulse are extracted. From an AND gate 61, into which are input output signals from the slicer 55 and a one-shot multivibrator 59, only a group bit pulse is extracted. From the slicer 55, a picture, itself separated into the black and white levels, is output with the digital pulses to be extracted but only data are extracted by AND gates 60 and 61, thus causing no problems for the regeneration of data. The group bit pulse resets the total system and initiates regeneration, as explained below.

In order to properly regenerate data back into its original form, a shift register 62 is shifted by one bit by a horizontal synchronizing signal. Each output of the shift register 62 and the AND gate 60 is connected to an AND gate 63 and each flip-flop in a memory 64 is respectively set to correspond to each output of the AND gate 63.

In 10 bit memory 64 either "1" or "0" is stored according to whether a data pulse occurs $\Delta t_1$ after a video signal synchronizing pulse, and an output signal from the 10 bit memory 64 is transferred in parallel into a buffer memory 65 after a parity check and a word, check which will be explained below, have been finished. An output of the buffer memory 65 may be used as digital data for a computer and the like or is connected to a common input terminal of groups of sample hold circuits 67 through a D/A converter 66 when used as analog data.

When ten horizontal synchronizing pulses are counted by the shift register 62, the data bit check is complete. A data bit pulse and a parity bit pulse to be checked by the next video signal are then counted on a flip-flop 68. The 11th bit of the shift register 62 and the output of the flip-flop 68 are input to an AND gate 69 for a parity check. As mentioned above, a parity bit has been so added that all the bits to the 11th should be either even or odd.

Unless data are put into disorder by noise, a pulse is output from the AND gate 69 after a parity check. A parity logic circuit 70, which is set by the output from the AND gate 69 and reset by the horizontal synchronizing pulse, takes the level "1" if the parity check gives a "go" sign. The output signal from the parity logic circuit 70 and the word bit pulse of the 12th bit of the shift register 62 are introduced into an AND gate 71. The output of the AND gate 71 sets a sample hold logic circuit 72. Output from the circuit 72 is supplied to the common gate of a group of AND gates 74 consisting of 16 channels, as mentioned below.

The channel pulse for regenerating analog data at each of the output terminals of the sample hold circuit 67, which are data input terminals 1 shown in FIG. 2 is detected as follows. Also presented below is a description of the analog data distribution among the output terminals of the sample hold circuit 67.

A vertical synchronizing pulse, separated from the video signal by the synchronizing separator 52, is delayed by a time slightly shorter than the delay time of the delay circuit 27 (shown in FIG. 2) by using a delay circuit 78. A gate pulse of several times the duration of the horizontal scanning period is produced at a one-shot multivibrator 79. This gate pulse and the output signal from the slicer 55 are input to an AND gate 80.

The channel command pulse input to the abovementioned video signal is detected at the AND gate 80 in order to produce a pulse to cover the effective scanning period, into which the channel pulse has been put through a synchronizing circuit 81. By using this pulse, a pulsed oscillator 82, having the same frequency as the pulsed oscillator 31 shown in FIG. 2, is started up, thereby activating a 16 bit shift register 83. An output from the synchronizing circuit 81 simultaneously with an output from the slicer 55, is input to AND gate 86, in order to extract a channel pulse.

An output consisting of each bit from the shift register 83 and the extracted channel pulse are introduced to a group of AND gates 85. In order to memorize an output from the group of AND gates 35, either "0" or "1" according to whether or not there exists channel pulse, a 16 bit flip-flop memory circuit 86 is provided. Therefore, the 16 bit channel memory circuit 86 revises its memory of the channel pulse during each effective horizontal scanning period in which the channel pulse covers one field of the vertical fly-back period. Therefore, no problem for the regeneration of data exists and if and when the number of the channels used changes, the system responds within one field. Assuming that the channels 1, 2, 4 . . . 16 are used, a 16 bit channel select shift register 87 is first cleared by the group bit pulse and then a gate logic circuit 88 is opened. Then an output of the circuit 88 and a clock pulse, which is an output from a clock pulse generator 75 and which has a frequency of about 1 MHz as mentioned above, are applied through an AND gate 89 to the shift register 87 to operate it.

Each output bit from the channel memory 86 and from the shift register 87 corresponds to an AND gate; at the correspondence with the 1st bit by means of the first pulse, a pulse is supplied to OR circuit 91 via one of a group of AND gates 90. This closes the gate logic circuit 88 and stops the shift register 87. The shift register 62 is put into operation by the horizontal synchronizing signal, to regenerate 10 data bits. At the completion of the parity check, a sample hold open-close pulse is output from the circuit 72 every 12th horizontal synchronizing pulse. Since the AND gate of the first bit of the AND gates 90 is "on", that of the 1st bit of the 16 bit sample hold circuit 74 will be "on". Thus, switching on the sample hold switch for the 1st channel of the 16 bit sample hold circuit 67 causes the data output terminal to be switched to take a new value of data.

The open-close pulse in inverted by an inverter 76, and the output thereof sets the logic circuit 88 to restart the shift register 87. The outputs of the channel memory circuit 86 and the shift register 87 are supplied to the AND gate 90 and the shift register 87 is operated until the channel pulse bit which corresponds to the bit indicating channels having no channel pulse, stored in channel memory circuit 86, is obtained. Thereafter, a correspondence pulse is output to the AND gate 90. Thus, an output from an OR gate 91 resets the gate logic circuit 88 and stops the shift register 87, sending data to output terminals corresponding to the channel pulse from the sample hold circuit 87. In this manner, data are regenerated at the same speed at which they were recorded.

If the present invention is used in direct connection with computers, it may be carried out so that the time indicated by the digital signal is put into a video signal during the recording process and during regeneration, the time is first output to be designated on the program, so that commencing at the designated time, data in digital form is being recorded.

The following process is also feasible, although it is not shown in the drawings. This alternative is identical to FIG. 2 with respect to the delay circuit 27, the synchronizing circuit 28, the delay circuit 29, the synchronizing circuit 30, the pulsed oscillator 31, the 4 bit counter 32, the digital multiplexer 33 and the channel select manual switch 3. Instead of the channel select manual switch 3, the division is made of an hour into 4 bits, of a minute into 6 bits and of a second into 6 bits in a 16 bit counter. The output from each of such bits is connected to the same devices as the group of AND gates 4 and the digital multiplexer 33 as series counters respectively 1/60, and 1/16, and an appropriate time is set by using digital switches or the like. Thereafter the 16 bit counter counts clock pulses of one second. Having been delayed further by an appropriate time other than the delay time of the channel command pulse of the delay circuit 27, the time command pulse is put in the video signal at the mixer 20. After that, the same method as that of putting the channel pulse in, may well be applied for putting the time pulse into the horizontal effective scanning period of the vertical fly-back period. If a one second clock pulse is used after counting down from the horizontal synchronizing signal or from the synchronizing signal of the synchronizing signal generator 16, very exact placing of time can be obtained, as a time pulse has been recorded for each field.

At the time of regneration when using the computer, a 16 bit time pulse is first sent to the computer, and at the directive of the computer, it is changed to a data pulse. There are first provided, as shown in FIG. 5, the delay circuit 78, the one-shot multivibrator 79, the gate 80, the logic circuit 81, the gate 84, the pulsed oscillator 82, the shift register 83, the AND gates 85 and the channel memory circuit 86. If the delay time of the delay circuit 78 is made to correspond with the time of the time command pulse, the channel memory circuit 86 will act as a time memory, of which the output is applied to the computer.

When transmission of the time pulse is stopped in order to transmit the data at the directive of the computer, it is convenient to have channel addresses provided to show which channel is used for the data under regeneration. A system for extracting the channel address is therefore provided, as follows:

The channel shift register 87 has skipped over the unused channels, and stops until the regeneration of the data of the used channel is complete. In order to have data of 16 channels regenerated all in a cycle, 16 clock pulses are applied to the channel select shift register 87. If a 4 bit counter is provided to be advanced by a count pulse from the shift register 87, the parallel 4 bit output from the 4 bit counter is turned into channel address data of the regenerated data. Meanwhile, digital data in 10 bit format is transmitted from the buffer memory 65. Thus, the recording and regeneration of time and the regeneration of the channel address are simplified when a computer is utilized. This makes the analysis of data at high speeds possible.

Another embodiment of the present invention presented below allows the recording speed to be increased.

The same system for inputing a channel pulse or a time pulse can be applied in this embodiment to the treatment of data. In other words, when a wide variety of data are transmitted at high speed to remote places, a video signal will fade out, but, if one datum in put into, say, one horizontal synchronizing signal, the sampling rate will increase 12 times higher than otherwise. In that case, the ITV is not required, but the built-in synchronizing signal generator will be sufficiently useful to put the whole system into operation by itself. That is, a pulse to activate the multiplexer 2 of FIG. 2 is a horizontal synchronizing signal; it also activates the pulsed oscillator at every horizontal synchronizing signal, and one word is recorded in the effective horizontal scanning period by using the same technical means as for inputting the channel pulse and the time pulse. If a channel select pulse is at such high speed in this case that channel change becomes unnecessary, the abovementioned means of inputting the data may be used. In case a high speed channel change is required, recording may be made during one horizontal scanning period at either the beginning or end of one group of data, which makes possible both channel selection and recording of data at high speed.

Figure 5:
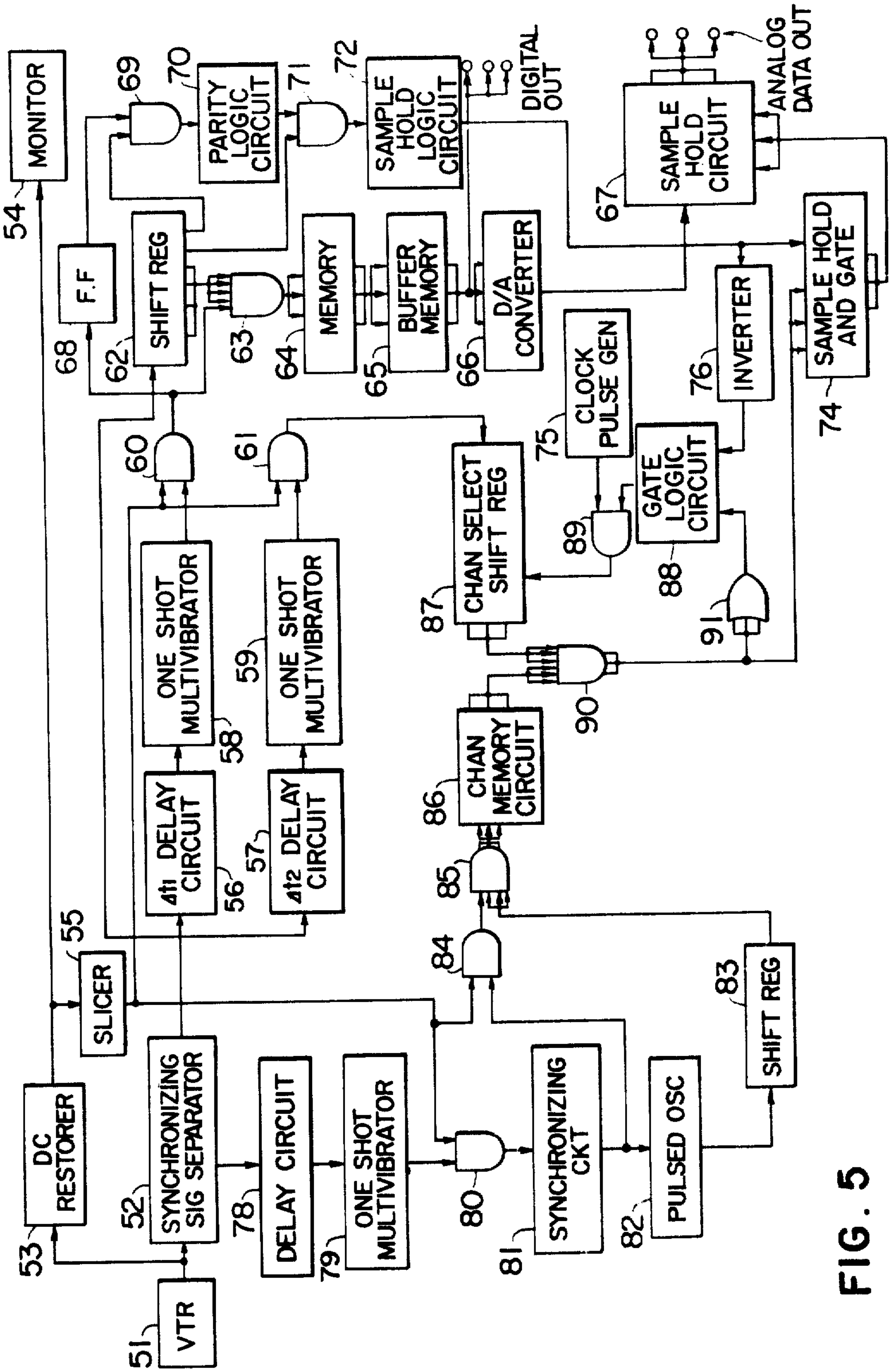
FIG. 5 is a block diagram of a system for regenerating a simultaneous, multiplex record of pictures and multichannel data under the channel memory system according to the invention.

In the case of regeneration, the application of the abovementioned means of having the channel memory circuit 86 of FIG. 5 memorize and regenerate a channel pulse, will make it possible to regenerate a channel pulse and data at the same sampling rate as at the time of recording.

If the generation frequency of the clock pulse generator 75 is substantially high, the abovementioned means is applicable also in the generation of the channel address. In order to raise the sampling rate, a data pulse which has been input as shown in FIG. 1*e*, may be changed in height so that recording is made to cover one data pulse with several bits, and a plurality of the slicers 55 of FIG. 5 may be provided so as to make the slice level changeable, one data pulse thereby being extended over a plurality of bits.

We claim:

1. A method of simultaneous multiplex recording of picture and multichannel data, which comprises: converting multichannel data serially into digital signals by a multiplexer and an analog to digital converter; synchronizing digital signals converted by said analog to digital converter with horizontal synchronizing signals separated from video signals issued from a television camera; and inserting said digital signals as pulses corresponding to the digital value "0" or "1", so as to have digital signals appear when the synchronized digital signals synchronize with said horizontal synchronizing signals delayed by a certain length of time, into a blanked space right after said horizontal synchronizing pulses of said video signals, thereby recording multichannel data together with a picture on a video tape recorder.

2. A method of simultaneous multiplex regenerating a picture and multichannel data, for reproducing data recorded by the method of claim 1 which comprises detecting pulses of multichannel data recorded right after horizontal synchronizing signals separated from video signals developed by a television camera, from a video tape having recorded thereon such data in the form of series digital signals as pulses; regenerating said pulses into digital signals constituting predetermined bits at the directive of a shift register activated by said horizontal synchronizing signals; and regenerating said data from said digital signals.

3. A method of simultaneous multiplex recording of picture and multichannel data, which comprises converting only data for predetermined channels into digital signals skipping over the channels not selected, synchronizing digital signals converted by said analog-to-digital converter with horizontal synchronizing signals separated from video signals issued from a television camera; and inserting said digital signals as pulses having a value "0" or "1", so as to have digital signals appear when the synchronized digital signals synchronize with said horizontal synchronizing signals delayed by a certain length of time, into a blanked space right after said horizontal synchronizing pulses; recording data in series according to channels while generating channel pulses to indicate the channels for recording such data and a channel command pulse to indicate the position of recording said channel pulses into an appropriate video period of the vertical blanking period of the video signals, and skipping over the channels not preselected; and inserting group bit pulses, after each cycle of the channels, into an appropriate part of the horizontal blanking period, somewhat delayed from data bit pulses, thereby recording multichannel data, combined with a picture, on a video tape recorder at a high sampling speed in recording data.

4. An apparatus for simultaneous multiplex recording and regeneration of pictures and data, such recording being made of analog and digital data in sets corresponding in number to the number of data input channels and in combination with video signals including horizontal synchronizing signals and vertical synchronizing signals, which comprises:

- a multiplexer means for generating the data sets sequentially in the order of the channels corresponding thereto;
- an analog to digital converter coupled to said multiplexer for converting the analog signals from said multiplexer into digital signals;
- a television camera for detecting video signals simultaneously with the detection of said data;
- blanking means operatively coupled to said camera for blanking the video signals from said television camera for a certain period following said horizontal synchronizing signals;
- a mixer means operatively coupled for inserting the data signals in digital form into the space of the video signals blanked by said blanking means;
- and a recorder operatively coupled to said mixer for recording the composite signals made at the mixer from the video signals and the data signals.

5. The apparatus claimed in claim 4, further comprising means coupled to said recorder for detecting pulses of the data signals from said recorder, means coupled to said detecting means for regenerating pulses of the detected data signals into digital signals and means coupled to said regenerating means for transmitting the signals from said regenerating means in the form of at least one of analog and digital signals.

6. An apparatus for simultaneous multiplex recording and regeneration of pictures and data, such recording being made of analog and digital data in sets corresponding in number to the number of data input channels, in combination with video signals including horizontal synchronizing signals and vertical synchronizing signals, which comprises:

- a multiplexer means for transferring the sets of data in the order of the channels numbers corresponding thereto;
- channel selecting means coupled to said multiplexer for opening the gates of said multiplexer for transmitting data therefrom in the order of channels while skipping the gates for such channels as contain no data;
- an analog to digital converter coupled to said multiplexer for converting the analog signals from said multiplexer into digital signals;
- a television camera for detecting video signals simultaneously with the detection of the data;
- a digital multiplexer means coupled to said analog to digital converter for reading out the data signals from said analog to digital converter;
- a counter means operatively coupled for counting said horizontal synchronizing signals, issuing a reading-out signal responsive to each said horizontal synchronizing signal to said digital multiplexer and issuing also thereto a word bit pulse to indicate the completion of reading-out of data from one channel after having counted a certain number of horizontal synchronizing signals;

blanking means coupled to said television camera for blanking the video signals from said television camera for a certain period after the horizontal synchronizing signals;

a mixer means coupled to said digital multiplexer for inserting the data signals from said digital multiplexer into the horizontal blanking space after a part of the video signals has been blanked out; and a recorder coupled to said mixer for recording the signals from said mixer as a combination of video signals and data signals.

7. The apparatus as recited in claim 6, further comprising means for generating horizontal synchronizing signals and vertical synchronizing signals and means operatively coupled for detecting the presence of horizontal synchronizing signals and vertical synchronizing signals in the video signals and automatically adding such signals to the video signals without the use of synchronizing signals.

8. The apparatus as recited in claim 6, further comprising means coupled to said channel selecting means, said means for generating horizontal synchronizing signals and vertical synchronizing signals and said mixer means for generating channel pulses indicating the channels in use under instruction by the signals from said channel selecting means and by the vertical synchronizing signals and transferring said pulses to said mixer means, means coupled to said synchronizing signal means, said mixer means and said channel selecting means for generating channel command pulses indicating the recording positions of said channel pulses under instruction by the vertical synchronizing signals and transmitting said pulses to said mixer means, and means coupled to said channel pulse means and said signal synchronizing means for generating group bit pulses indicating the completion of one cycle under instruction by the channel pulses and the horizontal synchronizing signals.

9. The apparatus claimed in claim 8, further comprising means operatively coupled for synchronously separating horizontal synchronizing signals and vertical synchronizing signals from the signals from said recorder, an abstracter operatively coupled for abstracting said data bit pulses, word bit pulses and group bit pulses from the signal from said recorder under instruction by the horizontal synchronizing signals, a shift register coupled to said synchronizing signal means and shifted by one bit by each horizontal synchronizing signal, means coupled to said abstractor and said shift register for regenerating the original data under instruction by the signals from said abstracter and also by the signals from said shift register, an analog to digital converter coupled to said regenerating means for converting the digital signals from said regenerating means into analog signals, a first detector operatively coupled for detecting the channel command pulses in the signals from said recorder under instruction by the vertical synchronizing signals, a second detector operatively coupled for detecting channel pulses in the signals from said recorder under instruction by the channel command pulses, a channel memory operatively coupled for detecting and memorizing the channels in use under instruction by the signals from said channel command pulse detecting means and also from said channel pulse detecting means, a channel select shift register coupled to said abstractor and shifted under instruction by the group bit pulses from said abstracter, a sample hold and gate operatively coupled to open and shut under instruction by the signals from the channel memory and also from the channel select shift register, and a sample hold circuit operatively coupled for transmitting the data signals from said analog to digital converter automatically according to the channels under instruction by the signals from said sample hold and gate.

10. The apparatus claimed in claim 9, further comprising, means operatively coupled for generating parity bit pulses at the same position as the data signals under instruction by the signals from said digital multiplexer means upon the completion of the construction of data bits in said digital multiplexer means and means operatively coupled for transmitting signals for detecting parity bit pulses under instruction by the signals from said data bit pulse abstracter and for transmitting to the sample hold and gates, signals for controlling the opening and shutting thereof.

* * * * *